Patented Nov. 9, 1948

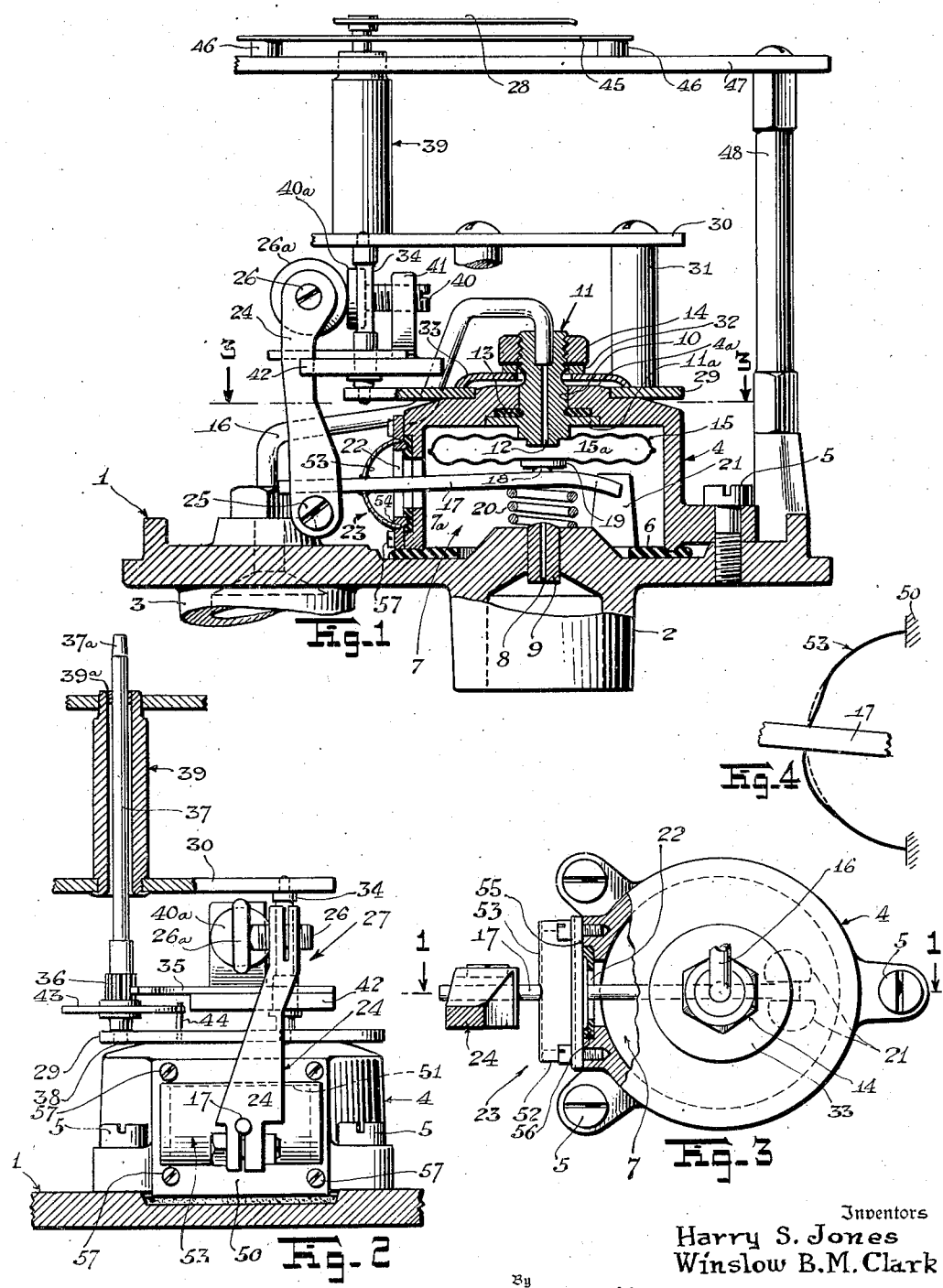

2,453,324

UNITED STATES PATENT OFFICE 2,453,324

MOTION SEAL

Harry S. Jones, East Orange, and Winslow B. M. Clark, West Orange, N. J., assignors to Thomas A. Edison, Incorporated, West Orange, N. J., a corporation of New Jersey Application January 22, 1945, Serial No. 574,004

12 Claims. (Cl. 286—29)

1

Our invention relates to an improved motion seal for transmitting a limited pivotal movement and more particularly to a motion seal adapted especially for transmitting uniplanar pivotal movement.

It is an object to provide an improved motion seal capable of transmitting limited pivotal movement without fluid leakage, friction or sliding parts.

It is another object to provide a motion seal which has a high degree of flexibility to the transmission of pivotal movement in a given plane and a high degree of rigidity to transmission of pivotal movement in all other planes.

It is another object to provide a motion seal for transmitting uniplanar pivotal movement which is relatively rigid against transmission of all other kinds of motion.

It is another object to provide a motion seal comprising a fluid-sealing diaphragm and a motion-transmitting lever wherein the membrane carries the lever.

It is another object to provide such motion seal wherein the diaphragm provides the sole pivotal support for the lever.

It is another object to provide such motion seal wherein the lever is not subjected to any substantial longitudinal displacement in response to varying pressure acting against the diaphragm.

It is another object to provide a durable motion seal wherein the diaphragm undergoes small distortional strain in the transmission of uniplanar pivotal movement.

It is a further object to provide a simple and economical construction of motion seal for the purposes herein set forth.

These and other objects and features of our invention will more fully appear from the following description and the appended claims.

The present motion seal is herein particularly described in connection with a "sealed-in" pressure gauge of the type described and claimed in the pending application of Hans H. Furn, Serial No. 572,540, filed January 12, 1945, and having a common assignee with the present invention. While the present motion seal has been especially adapted for, and has particular utility in connection with, this gauge, it will be understood that no unnecessary limitation of our invention to this application is intended, for the present motion seal has especial utility in connection with many other instruments and devices such as water gauges, depth gauges, flow meters, rate meters, vacuum devices, or wherever a limited

2 pivotal movement is to be transmitted through a wall across which a differential pressure is to be maintained.

In the description of our invention reference is had to the accompanying drawings, of which:

Figure 1 is a principally sectional view, with parts broken away, of a differential pressure gauge in which our invention is incorporated, taken substantially on the line 1—1 of the structure shown in Figure 3;

Figure 2 is a fractional lefthand elevational view of the structure of Figure 1, with parts thereof appearing in section;

Figure 3 is a fractional view taken from the line 3—3 of Figure 1 but with a portion of the housing of the gauge broken away; and Figure 4 is a fractional detailed view, to enlarged scale, illustrating the shape assumed by the diaphragm of the motion seal when it is in a flexed condition.

The pressure gauge shown in the accompanying figures is a differential gauge having a circular base 1 provided with inlet ports 2 and 3. At the side of the base opposite the port 2 there is an inverted cup-shaped housing 4 clamped by screws 5 against the base and sealed thereto by an intervening gasket 6. This housing forms with the base 1 a chamber 7 to which fluid communication is had through the port 2 and a restricted axial opening 8 in a plug 9 that leads from the port 2 into the chamber. In the top wall of the housing 4, at a point opposite the plug 9, there is an opening 10 in which there is a plug 11 having a small axial opening 12 extending therethrough. This plug has a flanged portion clamped tightly against the inner wall of the housing, and sealed fluid-tight thereto by an intervening gasket 13, under pressure of a nut 14 threaded onto the exterior portion of the plug. The plug 11 projects into the chamber 7 and has fixedly secured thereto, as by soldering, an apertured wall of a capsule 15. This capsule divides the space of the chamber 7 into separate fluid compartments: a compartment 7a exterior of the capsule and a compartment 15a inside the capsule. This compartment 15a communicates by way of the opening 12 of the plug 11 and a tube 16 to the other inlet port 3 above mentioned.

In the pressure compartment 7a there is a lever 17. This lever has a semispherical ball 18 which is held in contact with a button 19 on the capsule 15 under pressure of a compression spring 20 interposed between the lever and the base 1. The inner end portion of the lever is constrained from sidewise movement, relative to the capsule 15, by being interposed slidably between a pair of upstanding posts 21 on the base 1. The lever 17 extends to the outside of the housing 4 through an opening 22 in the side wall thereof. This opening is closed fluid-tight by a motion seal generally referred to as 23. This motion seal pivotally carries the lever 17 and is hereinafter described in detail.

On the exterior end portion of the lever 17 there is an upstanding arm 24 having a split lower end portion clamped to the lever by a bolt 25. Threaded into the upper end portion of this arm is a screw 26. The longitudinal axis of this screw lies substantially parallel to the medial plane of the capsule 15. The screw is provided with a circular concentric head 26a. By contact with the peripheral edge of this head 26a, a motion-amplifying mechanism 27 is driven according to the actuation of the capsule 15 to impart pressure-indicating movement to a pointer 28 at the top of the gauge.

The mechanism 27 includes a frame comprising lower and upper parallel plates 29 and 30 held in fixed spaced relation by a pair of intervening posts 31. The lower plate is apertured to fit onto a boss 4a provided at the top of the housing 4, and is clamped to the housing by the nut 14 aforementioned acting through a collar 32 and clamping disk 33, both of which surround the plug 11. Pivoted into the frame plates 29 and 30, but in offset relation to the medial plane of the head 26a of the screw 26, is a shaft 34 carrying a gear segment 35. This gear segment engages a pinion 36 on the lower end portion of a relatively long shaft 37 which carries the aforementioned pointer 28 at the top. The shaft 37 is journalled at 38 (see Figure 2) to the bottom frame plate 29 and is journalled at its upper end in the upper portion 39a of a sleeve 39 which is staked at the bottom to the upper frame plate 30. The gear 35 is controlled by the arm 24 through contact of the peripheral edge of the screw head 26a with the end face 40a of the head of a screw 40 carried by the gear. The screw 40 lies transverse to the shaft 34, and is mounted onto the gear segment 35 by being threaded through an apertured lug 41 of a member 42 which is secured to the gear segment and which serves as a counterweight therefor. Contact of the screw 40 with the screw 26 is maintained by a biasing of the gear segment provided by a hair spring 43 anchored at 44 to the frame plate 29.

When the capsule 15 expands, the lever 17 turns the gear segment clockwise and the pointer counterclockwise as viewed from the top of the gauge. Vice versa, when the capsule contracts the gear segment 35 is moved counterclockwise by the hair spring 43 and contact is maintained between the screws 40 and 26, the pointer being turned then in a clockwise direction. These movements of the pointer indicate the differential pressure between the compartments 7a and 15a in relation to a dial 45 bearing a suitable scale not shown, the dial being supported on standards 46 of a plate 47 which is carried by studs 48 that thread into the base plate 1.

As clearly explained in the Furn application abovementioned, the adjusting of the screw 26 varies the leverage between the lever 17 and the gear segment 35 to set the rate or sensitivity of the gauge—i. e., the deflection of the pointer per unit deflection of the capsule 15. Also, as explained in the abovementioned application, by adjusting the screw 40 in its mounting lug and correspondingly adjusting the arm 24 along the lever 17, the range of the path of contact between the screws 26 and 40 is shifted transversely with respect to the shaft 34 to control the scale distribution. Rough adjustments of the pointer to zero are made by setting the pointer on the shaft 37, but fine zero adjustments are made by the screw 40.

The motion seal 23 abovementioned includes a rectangular frame plate 50 having a central rectangular opening 51 and two parallel identical lugs 52 at opposite ends of this opening and at right angles to the frame plate. The lugs terminate on an arc and form end supports for a flexible metal diaphragm 53 made of a fatigue-resisting material such as beryllium copper. This diaphragm comprises simply a thin rectangular metal sheet shaped so as to have a single degree of curvature in cross section in one plane and to have a substantially rectilinear cross section in planes at right angles thereto; preferably, the sheet is bent to conform to the periphery of a cylinder, it being accordingly herein termed as having the shape of the longitudinal section of a cylinder. This diaphragm overlies the opening 51 and has its ends sealed to the arcuate peripheral edges of the lugs 52 and its rectilinear base portions in engagement with grooved portions 54 of the frame plate 50 and sealed thereto along the length of the diaphragm, the sealing in each instance being preferably carried out by silver soldering. The lever 17 extends snugly through a central hole in the diaphragm 53 and is rigidly secured and sealed thereto, also preferably by silver soldering. The motion seal thus comprises the diaphragm 53, its supporting frame 50 and the lever 17.

The housing 4 has a flat mounting face 55 surrounding the opening 22 and into which is partly inset a gasket 56. The frame plate seats on this mounting face and is clamped firmly thereto and in fluid-tight relation to the gasket 56 by four screws 57 which pass through corner portions of the frame plate and thread into the housing 4.

The motion seal 23 is mounted so that the longitudinal axis of the diaphragm 53 is substantially parallel to the medial plane of the capsule 15. This is done in order that the uniplanar pivotal movement of the lever 17 will be in the plane of the arcuate section of the diaphragm. In this plane of movement the diaphragm has relatively high distortional flexibility and is not subjected to high internal stresses such as might exceed the elastic limit of any portion of the diaphragm. For instance, when the lever 17 is deflected the diaphragm 53 assumes a shape which in the arcuate plane of the diaphragm is, to accentuated degree, substantially as shown in Figure 4. Since this shape involves substantially only simple flexure, the diaphragm is rendered durable and long-lived. As for unwanted sidewise movement of the lever in the plane of the longitudinal axis of the diaphragm 53, the diaphragm has a high distortional rigidity. Accordingly, the present cylindrical diaphragm is admirably adapted to applications where uniplanar pivotal movement is to be transmitted and where restraint is desired against pivotal movement in all other planes.

The present diaphragm has also high rigidity (stiffness) against being distended in response to the fluid pressure acting thereagainst. This is because, as taught in the Furn application abovementioned, the tensile stresses in the diaphragm material per unit of pressure acting against the diaphragm are reduced when the diaphragm has a uniformly curved or arcuate shape in cross section. For instance, this ratio is theoretically infinite at the initial increment of deflection of a flat planar diaphragm and is progressively less for diaphragms having smaller radii of curvature in cross section, the minimum ratio being attained when the diaphragm has an arcuate length of 180°—i. e., when the center of curvature of the diaphragm coincides with the medial plane of the opening which the diaphragm seals. Additionally, a diaphragm having a uniformly curved or arcuate shape in cross section has the advantage that this shape is initially that which the diaphragm tends inherently to assume when it is distended by pressure acting thereagainst. This has the effect of giving the diaphragm further stiffness as against distension in response to the pressure acting against it. Accordingly, it is found that the present diaphragm is substantially unresponsive to variations in pressure and that therefore the lever 17 is not subjected to any substantial longitudinal displacement by the pressure against the diaphragm.

We have found that the present cylindrical diaphragm serves inherently to provide a definite and substantially fixed fulcrum point for the lever 17 and that this fulcrum point is located at the junction of the lever with the diaphragm. Moreover, it is found that the diaphragm may serve as the sole pivotal support for the lever 17 in highly sensitive instruments of the character here described without introducing error because of displacement of the diaphragm in response to variations of pressure acting against it, this being particularly true because of the inherent stiffness of the diaphragm against unwanted movement as above explained. We accordingly preferably eliminate the provision of any auxiliary pivot for the lever 17, not so much because of the structural simplicity which it represents as because it avoids imposing possible strain on the diaphragm such as might tend to weaken it or shorten its life, and avoids the possible introduction of friction.

It may be noted that while the diaphragm has maximum stiffness against being distended from pressure when it has an arcuate length of 180°, the inherent strength of the diaphragm against sagging, in response to the weight of the lever 17 and arm 24, is reduced as the arcuate length of the diaphragm is increased. It is not found however that sagging is a critical problem in applications of the character described even when diaphragms of very thin material and of the maximum arcuate length of 180° are used.

By way of typical example, the following dimensions for the motion seal 23 have been satisfactorily employed: diaphragm thickness .003", radius of diaphragm in arcuate cross section .200", arcuate length of diaphragm approximately 150°, and linear length (along longitudinal axis of diaphragm) .776". It will, however, be understood that wide variations may be made in these dimensions to suit different applications.

While we have hereinabove particularly illustrated and described our invention in terms of a preferred specific embodiment, it will be understood that many changes and modifications may be made therein without departure from the scope of our invention, which we endeavor to express according to the following claims.

We claim:
1. A motion seal for transmitting uniplanar pivotal movement comprising a flexible diaphragm, a relatively rigid lever means secured in fluid-tight relation to said diaphragm and having extending portions at opposite sides thereof, said lever means being pivotally supported at its junction with said diaphragm, and said diaphragm being so shaped that the cross section thereof in the plane of said pivotal movement has a curvature of finite radius and the cross section thereof in a plane at right angles to said movement plane is substantially rectilinear.

2. A motion seal for transmitting uniplanar pivotal movement comprising a flexible diaphragm, a relatively rigid lever means secured in fluid-tight relation to said diaphragm and having extending portions at opposite sides thereof, said lever means being pivotally supported at its junction with said diaphragm, and said diaphragm having a substantially circular cross section in one plane and a substantially rectilinear cross section in a plane at right angles thereto whereby said diaphragm holds said lever means constrained to pivotal movement in said one plane.

3. A motion seal for transmitting uniplanar pivotal movement comprising a flexible diaphragm, a relatively rigid lever means secured in fluid-tight relation to said diaphragm and having extending portions at opposite sides thereof, said lever means being pivotally supported at its junction with said diaphragm, and said diaphragm having the shape of a longitudinal section of a cylinder.

4. A motion seal for transmitting uniplanar pivotal movement comprising a flexible diaphragm, a relatively rigid lever means secured in fluid-tight relation to said diaphragm and having extending portions at opposite sides thereof, said diaphragm carrying said lever means for pivotal movement about a transverse axis at a junction of the lever means with the diaphagm, and said diaphagm being so shaped that the cross section thereof at right angles to said pivot axis has a smooth semispherical shape with a curvature of finite radius.

5. A motion seal for transmitting uniplanar pivotal movement, comprising a flexible diaphragm, a lever means extending from opposite sides of a portion of said diaphragm and sealed thereto, said lever means being pivotally supported only by said diaphragm, and said diaphragm having a curved cross section in the plane of movement of said lever means and a substantially rectilinear cross section in the plane at right angles to said first-mentioned plane whereby said lever is constrained substantially to uniplanar movement.

6. A motion seal for transmitting uniplanar pivotal movement, comprising a diaphragm having a curved cross section in one plane and a substantially rectilinear cross section in another plane at right angles to said first mentioned plane to cause the diaphragm to have substantial distortional flexibility in said one plane and relative distortional rigidity in said other plane, and lever means secured in fluid-tight relation to said diaphragm and having extending portions at opposite sides thereof, said lever means being pivotally carried by said diaphragm.

7. A motion seal for transmitting pivotal movement between the inside and outside of a chamber comprising a sheet of flexible material forming a wall section of said chamber, said sheet being bent to conform to the surface of a cylinder, and relatively rigid lever means extending from opposite sides of said sheet and sealed thereto.

8. The subject matter set forth in claim 7 wherein said chamber contains a fluid normally at a pressure different from that of the outside of the chamber, and said sheet is concave at its higher-pressure side.

9. A motion seal comprising a diaphragm shaped to conform to the surface of a cylinder and having an arcuate length greater than 90° and less than 180°; a frame sealed to the rim portion of said diaphragm; and a lever sealed to the central portion of said diaphragm and carried thereby.

10. A motion seal comprising a diaphragm having a curved cross section of finite radius in one plane and a substantially rectilinear cross section in a plane at right angles thereto; a rigid frame sealed to the rim portion of said diaphragm and forming a support therefor; and a lever sealed to a central portion of said diaphragm, said diaphragm constituting a sole pivotal support for said lever.

11. A motion seal comprising a frame having a base portion provided with an opening and having projecting members at opposite sides of said opening, said members terminating on an arc; a diaphragm having the shape of the longitudinal section of a cylinder, the curved rim portions of said diaphragm being supported on and sealed to the peripheral edges of said projecting members and the rectilinear rim portions of said diaphragm being sealed to said base portion; and a lever passing through and sealed to said diaphragm.

12. The subject matter set forth in claim 11 wherein said base portion is grooved and engaged by the rectilinear rim portions of said diaphragm.

HARRY S. JONES.
WINSLOW B. M. CLARK.

REFERENCES CITED

The following references are of record in the file of this patent:

UNITED STATES PATENTS

| Number | Name | Date |
|---|---|---|
| 1,747,333 | Vogt | Feb. 18, 1930 |
| 1,992,048 | Temple | Feb. 19, 1935 |